(12) United States Patent
Hori et al.

(10) Patent No.: US 7,809,078 B2
(45) Date of Patent: Oct. 5, 2010

(54) OFDM MODULATOR

(75) Inventors: Kazuyuki Hori, Tokyo (JP); Yuji Ishida, Fujisawa (JP); Shouhei Murakami, Yokohama (JP); Kenji Yanagi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 227 days.

(21) Appl. No.: 12/027,035

(22) Filed: Feb. 6, 2008

(65) Prior Publication Data

US 2008/0219372 A1  Sep. 11, 2008

(30) Foreign Application Priority Data

Mar. 9, 2007  (JP) .............................. 2007-060366

(51) Int. Cl.
- *H04L 27/00* (2006.01)
- *H04L 25/03* (2006.01)
- *H04L 27/36* (2006.01)
- *H04J 11/00* (2006.01)

(52) U.S. Cl. ...................... 375/295; 375/296; 375/298; 370/210

(58) Field of Classification Search ................. 375/260, 375/295, 296, 297, 261, 298; 370/208, 206, 370/210; 332/103, 106, 107, 117, 123, 149, 332/159; 708/400, 402, 403, 404, 405

See application file for complete search history.

(56) References Cited

U.S. PATENT DOCUMENTS

| | | | | |
|---|---|---|---|---|
| 7,292,639 B1 * | 11/2007 | Demirekler et al. | ......... | 375/260 |
| 2004/0136314 A1 * | 7/2004 | Jung et al. | .................. | 370/203 |
| 2005/0208906 A1 * | 9/2005 | Miyoshi et al. | ............. | 455/122 |
| 2008/0043861 A1 * | 2/2008 | Moffatt | ...................... | 375/260 |
| 2009/0180574 A1 * | 7/2009 | Futagi et al. | ................ | 375/296 |

FOREIGN PATENT DOCUMENTS

JP  2003-124824  4/2003

OTHER PUBLICATIONS

Mobile IT Forum 4G Technical Survey Report: System Infrastructure (Ver. 1.1).

* cited by examiner

*Primary Examiner*—Tesfaldet Bocure
(74) *Attorney, Agent, or Firm*—Mattingly & Malur, P.C.

(57) ABSTRACT

An OFDM modulator having a peak factor reduction function. The OFDM modulator has a peak factor reduction unit between an IFFT unit and a guard interval insertion unit thereof. The peak factor reduction unit converts a complex signal X1 outputted from the IFFT unit into a complex signal X2 with a reduced peak factor based on subcarrier map information. The peak factor reduction unit generates a peak factor reduction signal by a linear combination of complex exponential functions that correspond to subcarrier frequencies to be used for wave transmission, as bases. The peak factor reduction signal is derived by repetition of, for example, a weighted least squares method or convolution processing by a fast Fourier transform.

7 Claims, 15 Drawing Sheets

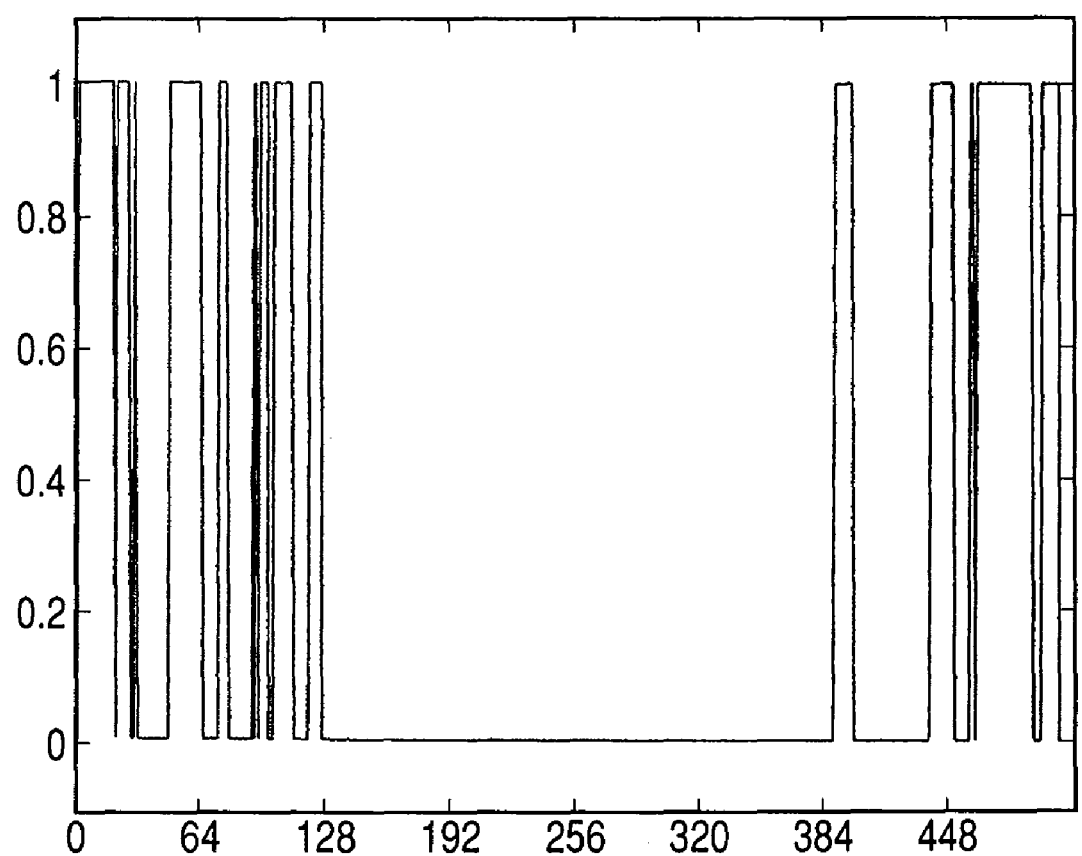

IFFT INPUT SIGNAL (RE PART)

IFFT INPUT SIGNAL (IM PART)

IFFT OUTPUT SIGNAL (RE PART)

IFFT OUTPUT SIGNAL (IM PART)

FIG. 6

$$F = \begin{bmatrix} e^{\frac{j2\pi}{8}\times 0} & e^{\frac{j2\pi}{8}\times 0} & e^{\frac{j2\pi}{8}\times 0} & e^{\frac{j2\pi}{8}\times 0} & e^{\frac{j2\pi}{8}\times 0} & e^{\frac{j2\pi}{8}\times 0} & e^{\frac{j2\pi}{8}\times 0} & e^{\frac{j2\pi}{8}\times 0} \\ e^{\frac{j2\pi}{8}\times 0} & e^{\frac{j2\pi}{8}\times 1} & e^{\frac{j2\pi}{8}\times 2} & e^{\frac{j2\pi}{8}\times 3} & e^{\frac{j2\pi}{8}\times 4} & e^{\frac{j2\pi}{8}\times 5} & e^{\frac{j2\pi}{8}\times 6} & e^{\frac{j2\pi}{8}\times 7} \\ e^{\frac{j2\pi}{8}\times 0} & e^{\frac{j2\pi}{8}\times 2} & e^{\frac{j2\pi}{8}\times 4} & e^{\frac{j2\pi}{8}\times 6} & e^{\frac{j2\pi}{8}\times 0} & e^{\frac{j2\pi}{8}\times 2} & e^{\frac{j2\pi}{8}\times 4} & e^{\frac{j2\pi}{8}\times 6} \\ e^{\frac{j2\pi}{8}\times 0} & e^{\frac{j2\pi}{8}\times 3} & e^{\frac{j2\pi}{8}\times 6} & e^{\frac{j2\pi}{8}\times 1} & e^{\frac{j2\pi}{8}\times 4} & e^{\frac{j2\pi}{8}\times 7} & e^{\frac{j2\pi}{8}\times 2} & e^{\frac{j2\pi}{8}\times 5} \\ e^{\frac{j2\pi}{8}\times 0} & e^{\frac{j2\pi}{8}\times 4} & e^{\frac{j2\pi}{8}\times 0} & e^{\frac{j2\pi}{8}\times 4} & e^{\frac{j2\pi}{8}\times 0} & e^{\frac{j2\pi}{8}\times 4} & e^{\frac{j2\pi}{8}\times 0} & e^{\frac{j2\pi}{8}\times 4} \\ e^{\frac{j2\pi}{8}\times 0} & e^{\frac{j2\pi}{8}\times 5} & e^{\frac{j2\pi}{8}\times 2} & e^{\frac{j2\pi}{8}\times 7} & e^{\frac{j2\pi}{8}\times 4} & e^{\frac{j2\pi}{8}\times 1} & e^{\frac{j2\pi}{8}\times 6} & e^{\frac{j2\pi}{8}\times 3} \\ e^{\frac{j2\pi}{8}\times 0} & e^{\frac{j2\pi}{8}\times 6} & e^{\frac{j2\pi}{8}\times 4} & e^{\frac{j2\pi}{8}\times 2} & e^{\frac{j2\pi}{8}\times 0} & e^{\frac{j2\pi}{8}\times 6} & e^{\frac{j2\pi}{8}\times 4} & e^{\frac{j2\pi}{8}\times 2} \\ e^{\frac{j2\pi}{8}\times 0} & e^{\frac{j2\pi}{8}\times 7} & e^{\frac{j2\pi}{8}\times 6} & e^{\frac{j2\pi}{8}\times 5} & e^{\frac{j2\pi}{8}\times 4} & e^{\frac{j2\pi}{8}\times 3} & e^{\frac{j2\pi}{8}\times 2} & e^{\frac{j2\pi}{8}\times 1} \end{bmatrix}$$

FIG. 7

$$B = \begin{bmatrix} e^{\frac{j2\pi}{8}\times 0} & e^{\frac{j2\pi}{8}\times 0} & e^{\frac{j2\pi}{8}\times 0} \\ e^{\frac{j2\pi}{8}\times 1} & e^{\frac{j2\pi}{8}\times 6} & e^{\frac{j2\pi}{8}\times 7} \\ e^{\frac{j2\pi}{8}\times 2} & e^{\frac{j2\pi}{8}\times 4} & e^{\frac{j2\pi}{8}\times 6} \\ e^{\frac{j2\pi}{8}\times 3} & e^{\frac{j2\pi}{8}\times 2} & e^{\frac{j2\pi}{8}\times 5} \\ e^{\frac{j2\pi}{8}\times 4} & e^{\frac{j2\pi}{8}\times 0} & e^{\frac{j2\pi}{8}\times 4} \\ e^{\frac{j2\pi}{8}\times 5} & e^{\frac{j2\pi}{8}\times 6} & e^{\frac{j2\pi}{8}\times 3} \\ e^{\frac{j2\pi}{8}\times 6} & e^{\frac{j2\pi}{8}\times 4} & e^{\frac{j2\pi}{8}\times 2} \\ e^{\frac{j2\pi}{8}\times 7} & e^{\frac{j2\pi}{8}\times 2} & e^{\frac{j2\pi}{8}\times 1} \end{bmatrix}$$

OFDM MODULATOR

CLAIM OF PRIORITY

The present application claims priority from Japanese application JP 2007-060366 filed on Mar. 9, 2007, the content of which is hereby incorporated by reference into this application.

FIELD OF THE INVENTION

The present invention relates to a radio transmitter, and more specifically, to a modulator of the radio transmitter for OFDM and a peak factor reduction device.

BACKGROUND OF THE INVENTION

In the field of radio communications, various communication systems are being studied and put to practical use aiming at improvement in frequency utilization efficiency. OFDM (Orthogonal Frequency Division Multiplexing) that is one of these systems is robust against multi-path delay waves, and is regarded as favorite as the fourth generation mobile communication system.

A typical radio transmitter to which the OFDM modulation system is applied performs primary modulation on a bit string of transmit data with a modulator of QAM (Quadrature Amplitude Modulation) etc. to convert the transmit data into complex symbols on a predetermined number of bits basis. In the case where a 16 QAM modulator is used as the primary modulator (symbol mapper), the transmit data is converted into a complex symbol sequence of QAM on a four-bit basis.

The complex symbol sequence generated by the symbol mapper is broken into blocks with a predetermined number of symbols by a serial to parallel converter. In the following explanation, the number of complex symbols of a block into which the data is broken by the serial to parallel converter is designated by NSC. NSC complex symbols that are outputted from the serial to parallel converter after having been blocked are added with an arbitrary number of zero-value symbols so that the total number of the complex symbols may become a number that can be expressed by powers of 2 (hereinafter designated by NFFT). The signal block having an increased number of symbols is subjected to secondary modulation by an inverse fast Fourier transform (IFFT) device to be converted to NFFT complex numbers that will be a sampling number of OFDM symbols.

In OFDM, since data is modulated by NSC subcarriers that differ mutually in frequency and is correlated with non-zero complex symbols by the IFFT device among NFFT orthogonal subcarriers, OFDM may be called a kind of multicarrier modulation system.

In OFDM, principally, NFFT complex symbol values (sampled values) outputted serially from the NFFT device are converted into a serial signal sequence by a parallel to serial converter, becoming complex baseband OFDM signals. After being converted into the analog continuous signal by the D/A converter, the complex baseband OFDM signal is multiplied by a carrier wave, being converted into an OFDM signal in the RF waveband. The OFDM signal that became a serial signal and constitutes one block is called an OFDM symbol, and its length is called a symbol length.

Since the OFDM signal transmitted after being power amplified by the RF transmitting unit arrives at a receiver being divided into a direct wave that does not suffers reflection on the way of transmission and a delayed wave that is reflected by obstacles on a transmission path, the delayed wave acts as noise against the direct wave. Then, in order to remove an effect of the delayed wave, the OFDM transmitter forms an OFDM symbol that was made redundant and consists of (NFFT+NCP) sample points by copying NCP sample points belonging to the second half part in each OFDM symbol that consists of NFFT sample points and inserting them into the first half part. The above-mentioned redundant portion is called a cyclic prefix, and acts as a guard interval for removing the effect of the delayed wave. If the cyclic prefix length NCP is longer than or equal to the delay time of the multi-path delay wave, the effect of the delayed wave can be removed on the OFDM receiver side.

The parallel to serial converter is converting the (NFFT+NCP) sample points thus obtained into serial signals. Moreover, since a transmission spectrum of the OFDM signal transmitted from the RF transmitting unit tends to widen because the signals become discontinuous between the symbols, the signals are configured to be continuous by conducting taper processing on a connection part between the symbols using an appropriate window function after inserting the guard interval (cyclic prefix). Moreover, as necessary, a band limiting filter is provided to suppress the widening of the transmission spectrum.

In the OFDM system, multiple subcarriers each having a different frequency are used in modulating the transmission symbol, and so each transmission symbol can be regarded as a mutually decorrelative random signal. Therefore, it is known that according to the central limit theorem, a signal distribution approaches a normal distribution and a peak factor (the ratio between the maximum electric power and the average electric power) of a transmitted wave will also amount to 10 dB-12 dB. Although a modulated signal is transmitted after being amplified by the power amplifier of the RF transmitter, generally, there is a limitation in the linear area of the amplifier and the modulated signal of the OFDM is saturated with a large output. Therefore, when the power amplifier gives rise to saturation to a peak amplitude of the transmitting signal, distortion arises in a transmission waveform, which will leak an electric power to the outside of a transmission wave band, especially to adjacent frequency bands. Since this leakage electric power is strictly regulated by the radio wave regulations, it becomes difficult for the transmitter of the OFDM to increase a transmit power sufficiently up to a rated output of the power amplifier.

In order to solve such a problem, peak factor reduction of the transmitting signal becomes effective. The peak factor reduction here means signal waveform processing such that the peak amplitude is controlled while allowing slight deterioration, namely, addition of noise, in waveform quality. As one of the conventional technologies of the peak factor reduction, for example, JP-A 2003-124824, "PEAK FACTOR REDUCTION DEVICE" (Patent document 1) proposes a peak factor reduction device that, taking a baseband signal of CDMA as an object, generates a correction signal in the shape of impulse at a sample point where the peak of the amplitude becomes maximum, reshapes this signal in waveform with a filter having an equivalent frequency response as that of a baseband band limiting filter, and subtracts it from the baseband signal. Since the correction signal is not a component contained in the original signal, it acts as noise to the transmitting signal. However, since the waveband of the correction signal is masked so as to be in a range of the transmission spectrum of the filter, noise leakage to the outside of the transmission band is prevented.

SUMMARY OF THE INVENTION

As a multiple access system using OFDM, OFDMA (Orthogonal Frequency Division Multiple Access) is known. According to 3.1.3 of "Mobile IT Forum, 4G technical investigation report (volume on system infrastructure) (Ver 1.1)," Fourth generation mobile sectional meeting, System technical committee, System infrastructure working group of the Mobile IT Forum (Nonpatent document 1), OFDM is defined as a method "whereby multiple access is realized by allowing all the user to share all the subcarriers, designating an arbitrary plurality of subcarriers as subchannels, and assigning the subchannels to respective users adaptively in arbitrary timing. FIG. 3.1.4 of "Mobile IT Forum, 4G technical investigation report (volume on system infrastructure) (Ver 1.1)" discloses one example of how to assign subcarriers.

In the case where the conventional technology is applied to the OFDMA, a new problem that is hard to solve arises. In OFDMA, it can be determined arbitrarily which subcarrier is used to be modulated by the signal, and subcarriers that convey no information on them become stop waves. At this time, the shape of a transmission spectrum becomes wavy complicatedly and violently. It becomes important that the transmission spectrum of the correction signal (noise) is masked so that the correction signal may not be leaked to the outside of the band. However, in the conventional technology, a filter characteristic of a waveform reshape filter that is acted on the correction signal in the shape of impulse must be like a characteristic shape of the transmission spectrum. Therefore, the filter characteristic becomes very complicated. In addition to this, the filter characteristic must be variable according to a subcarrier stop wave pattern, and accordingly a device scale will increase remarkably.

The object of the present invention is to provide an OFDM modulator that has a peak factor reduction function suitable for a radio transmitter of the OFDM system.

In order to attain the object, the present invention provides an OFDM modulator that comprises: a QAM modulator for performing primary modulation on transmit data supplied as serial data, a serial to parallel converter for blocking complex signals outputted from the QAM modulator for each set of a predetermined number (NSC) of complex symbols and outputting them as parallel complex symbol signals, a subcarrier mapping unit for mapping each of the complex symbol signals that were outputted from the serial to parallel converter on one of the subcarriers mutually different in frequency (NFFT>NSC), an IFFT unit for performing an inverse fast Fourier transform on the complex symbol outputted from the subcarrier mapping unit and outputting it in parallel as a complex signal X1, a guard interval insertion unit for adding a cyclic prefix acting as the guard interval to the complex signal and performing window processing, and a parallel to serial converter for converting the output of the guard interval insertion unit into a serial signal, is characterized by further having a peak factor reduction unit being located between the IFFT unit and the guard interval insertion unit and for converting the complex signal X1 into a complex signal X2 with a reduced peak factor based on the subcarrier map information M, and is characterized in that the guard interval insertion unit is configured to add a cyclic prefix to the complex signal X2 with the reduced peak factor and perform window processing.

Explaining it in further detail, the OFDM modulator of the present invention specifies a frequency of the transmit subcarrier that should transmit a complex symbol generated by the QAM modulator and a frequency of the stop wave subcarrier that does not contain an effective complex symbol, and the peak factor reduction unit converts the complex signal X1 into the complex signal X2 with a reduced peak factor, based on a complex exponential function B that corresponds to transmit subcarrier frequencies generated based on the subcarrier map information.

In a first embodiment of the present invention, the peak factor reduction unit substantially consists of a complex exponential function generation unit for generating the complex exponential function B that corresponds to transmit subcarrier frequencies based on the subcarrier map M, and a weight vector generation unit that detects an amplitude exceeding a threshold being set beforehand from the complex signal X1 outputted from the IFFT unit and generates a weight vector W, and a complex signal generation unit for converting the complex signal X1 into the complex signal X2 with a reduced peak factor based on the complex exponential function B, the weight vector W, and the complex signal X1.

In this case, the complex signal generation unit converts the complex signal X1 into the complex signal X2 with reduced peak factor based on, for example, a formula of the least squares method, $$X2 = B \times \text{inv}(B' \times \text{diag}(W) \times B) \times B' \times \text{diag}(W) \times \text{clip}(X1)$$

(where diag denotes a diagonal matrix whose diagonal elements are an argument W, B' denotes a complex conjugate transposed matrix of B, inv denotes an inverse matrix, and clip denotes performing amplitude limitation with a threshold Vt while keeping an argument).

In another embodiment of the present invention, the peak factor reduction unit generates a complex signal in a procedure of using the complex signal X1 as an initial input of the amplitude clipping in a generation period of the complex signal X1, performing a Fourier transform on the complex signal whose amplitude was clipped, and performing an inverse fast Fourier transform on a multiplication result of the Fourier transform result and the subcarrier map information M. The above-mentioned procedure is repeated using the complex signal X2 generated by the inverse fast Fourier transform as an input of amplitude clipping until the amplitude of the complex signal X2 becomes less than or equal to the threshold Vt.

In further another embodiment of the present invention, the peak factor reduction unit has a complex exponential function generation unit for generating the complex exponential function B that corresponds to transmit subcarrier frequencies based on the subcarrier map M, and a complex signal generation unit that generates a difference signal X1−clip(X1) between the complex signal X1 and a signal obtained from the complex signal X1 by limiting the amplitude thereof to be within the threshold Vt, calculates a coefficient vector C that minimizes an electric power of B·C using a Lagrange's undetermined multipliers method so that, representing an inner product of the complex exponential function B and the coefficient vector C with B·C, X1−clip(X1)−B·C=0 is established at a position where an amplitude of X1 satisfies |X1|>Vt, and generates the complex signal X2 on a condition of X2=X1−B·C.

Since the peak factor of the complex signal X1 is reduced using the subcarrier map information M in the present invention, in other words, since the peak factor signal X2 is generated as a linear combination of the subcarriers whose frequencies are the same as those of the subcarriers used in the transmission, the shape of the transmission spectrum of the complex signal X1 before peak factor reduction principally agrees with that of the complex signal X2 after the peak factor reduction. That is, since the spectrum of the noise signal accompanying peak factor reduction processing is masked by the spectrum of the transmitting signal, leakage of the noise electric power to the stop wave band can be prevented.

BRIEF DESCRIPTION OF THE DRAWINGS

FIG. 2 is a diagram showing one example of subcarrier map information M.

FIG. 3A shows a waveform of the real part thereof, and FIG. 3B shows a waveform of the imaginary part thereof.

FIG. 6 is a diagram showing one example of an inverse DFT (Inverse Discrete Fourier Transform) matrix F.

FIG. 7 is a diagram showing one example of a complex exponential function B.

DETAILED DESCRIPTION OF THE PREFERRED EMBODIMENTS

Figure 1:
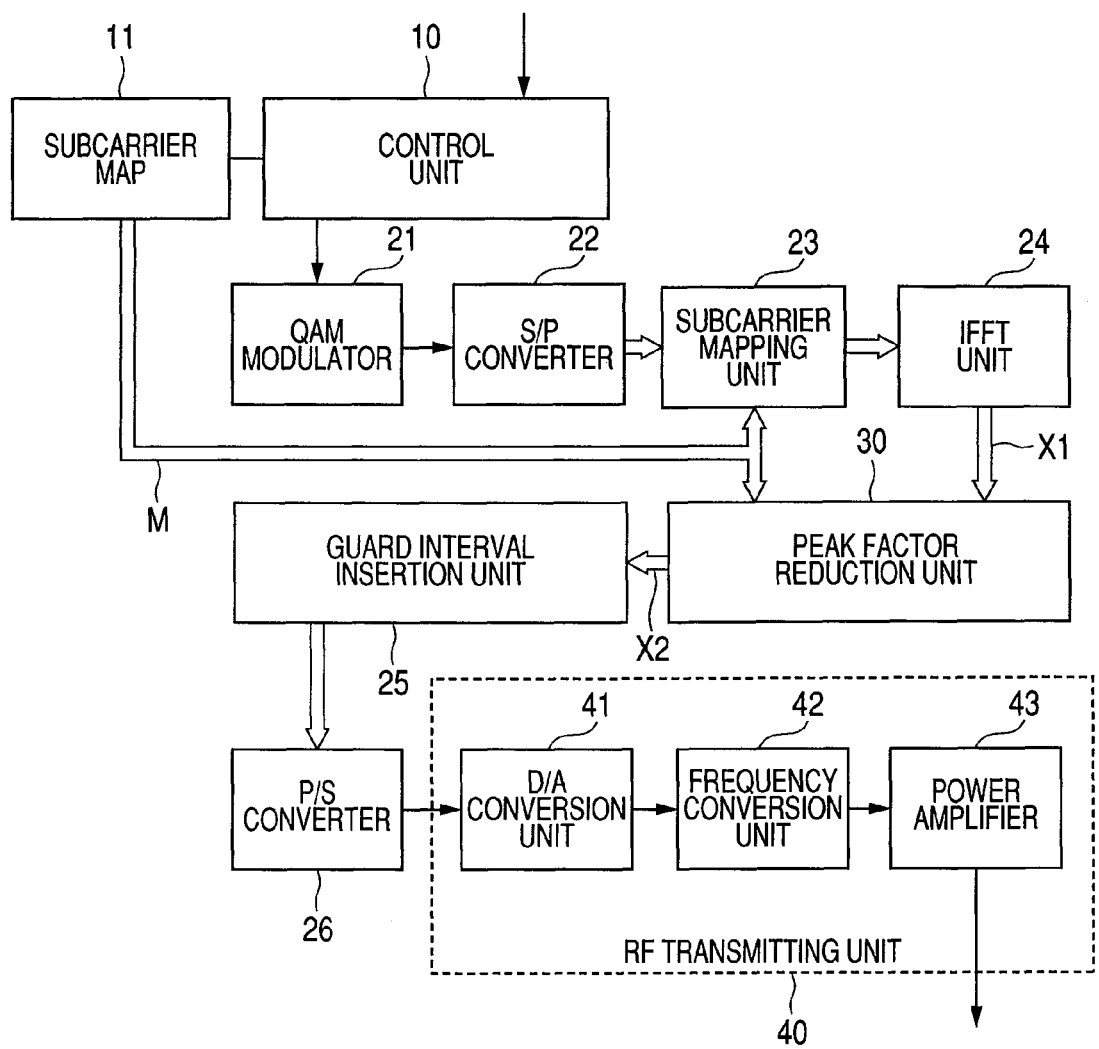
FIG. 1 is a diagram showing one example of an OFDM modulator to which the present invention is applied.

FIG. 1 shows one example of an OFDM modulator to which the present invention is applied. The OFDM modulator of the present invention is connected between, for example, a control unit 10 of a radio base station and an RF transmitting unit 40 thereof, and has a configuration of incorporating a peak factor reduction device 30. Table 1 shows specifications of the OFDM modulator that will be described in the following embodiment. However, parameter values exemplified here are appropriately determined in order to explain operations of the OFDM modulator more concretely, and they do not specify application objects of the present invention.

TABLE 1

| OFDM specifications | | |
|---|---|---|
| Parameter | Symbol | Value |
| Number of IFFT points (Total number of subcarriers) | NFFT | 512 |
| Number of transmit subcarriers | NSC | 128 |
| Cyclic prefix length | NCP | 64 |
| Sampling frequency | Fs | 4 MHz |

In the OFDM modulator shown in FIG. 1, a bit string of transmit data outputted serially from the control unit 10 is inputted into a QAM modulator 21, and is converted into, for example, a QAM signal sequence (complex symbol signal sequence) of a 16 QAM system. The QAM signal sequence outputted from the QAM modulator 21 is inputted into the serial to parallel (S/P) converter 22, is blocked for each of 128 complex symbols expressed by NSC, and is outputted in parallel.

The complex symbol signal outputted from the serial to parallel converter 22 is mapped into a transmit subcarrier in a subcarrier mapping unit 23, and subsequently is supplied to an IFFT (inverse fast Fourier transform) unit 24. The subcarrier mapping unit 23 maps each of 128 complex symbol signals to one of 512 subcarriers based on subcarrier map information M outputted from a subcarrier map 11 that can be controlled by the control unit 10. Although the contents of the subcarrier map 11 can be altered dynamically, in order to explain a transmission spectrum with reference to the drawings in this embodiment, it is assumed that the subcarrier map information M is regarded as being fixed temporally.

FIG. 2 shows one example of the subcarrier map information M. In the example shown here, a horizontal axis indicates index values corresponding to NFFT (=512) subcarriers, respectively, and a subcarrier with a vertical axis value of "1" means wave transmission while a subcarrier with a value of "0" means stop wave. In this embodiment, NSC (=128) subcarriers among NFFT (=512) subcarriers act as transmit waves, and remaining 384 subcarriers are in a state of stop wave. Incidentally, the subcarriers of indices 0 to 255 correspond to Nyquist frequencies of direct current to positive in a baseband frequency domain; those of indices 256 to 511 correspond to negative Nyquist frequencies in the domain.

Figure 3A:
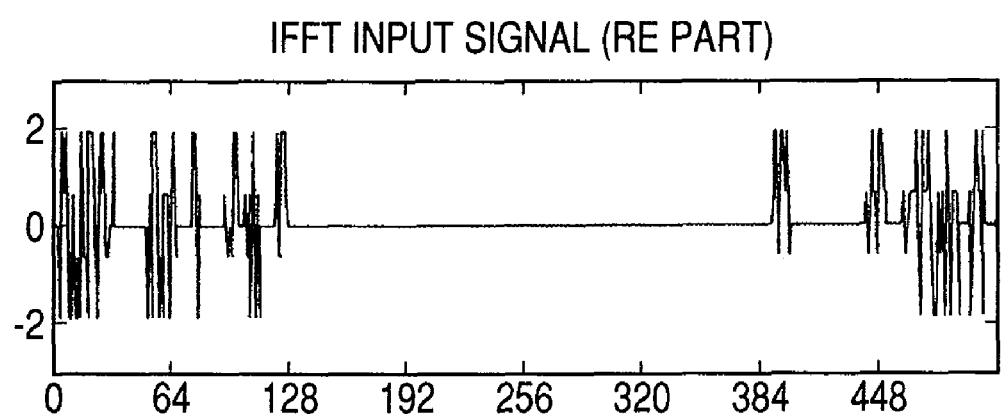
FIGS. 3A and 3B are diagrams showing one example of a complex symbol signal supplied to an IFFT unit 24.
Figure 3B:
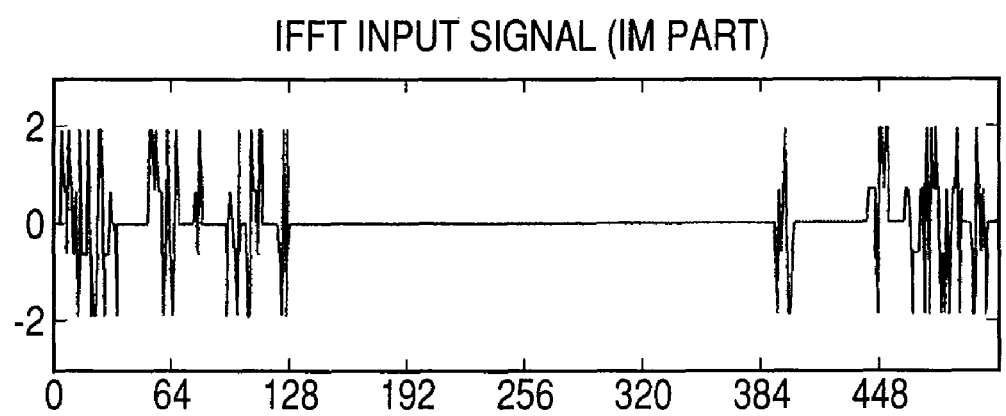

FIG. 3 shows the complex symbol signal (16 QAM signal) constituting 1 block to be supplied to the IFFT unit 24 when the subcarrier map information M of FIG. 2 is applied. FIG. 3A shows a waveform of the real part of the complex symbol signal, and FIG. 3B shows a waveform of the imaginary part of the complex symbol signal.

Figure 4A:
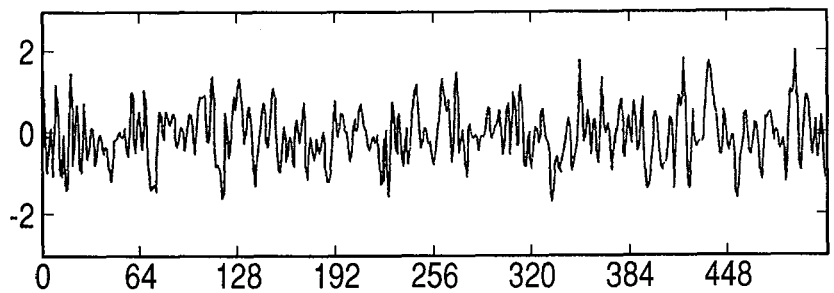
FIGS. 4A and 4B are diagrams showing signal wave forms of the real part unit (FIG. 4A) and the imaginary part (FIG. 4B) of a complex signal X1 outputted from the IFFT unit 24, respectively.
Figure 4B:
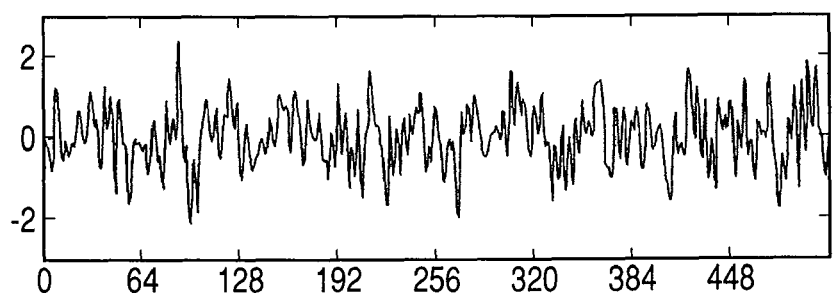

In FIG. 1, the IFFT unit 24 converts the complex symbol signal outputted from the subcarrier mapping unit 23 into a complex signal X1 by performing an inverse Fourier transform. FIG. 4A shows a signal waveform of the real part of the complex signal X1 outputted from the IFFT unit 24; FIG. 4B shows a signal waveform of the imaginary part of the outputted complex signal X1.

The conventional OFDM modulator inputs the complex signal X1 outputted from the IFFT unit 24 into a guard interval insertion unit 25 and performs insertion of a cyclic prefix and window (window function) processing. In the present invention, the output signal X1 of the IFFT unit 24 is made to input into the peak factor reduction unit 30, and the complex signal X2 with a peak factor reduced by the peak factor reduction unit 30 is supplied to the guard interval insertion unit 25.

The output of the guard interval insertion unit 25 is converted into a serial signal by a parallel to serial (P/S) converter 26, and subsequently is inputted into the RF transmitting unit 40. The RF transmitting unit 40 substantially consists of a D/A converter 41 for converting the output signal of the parallel to serial converter 26 into an analog signal, a frequency conversion unit 42 for converting the baseband OFDM signal into an OFDM signal in the RF band, and a power amplifier 43. The output signal of the power amplifier 43 is transmitted as a radio signal from an unillustrated antenna.

Figure 5:
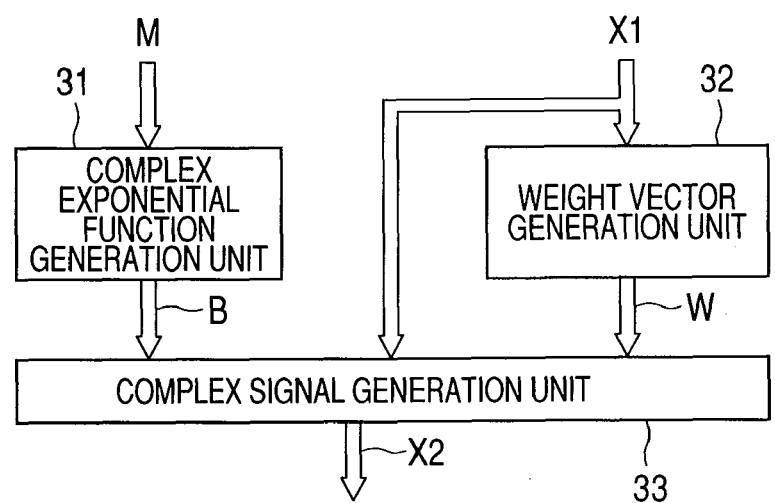
FIG. 5 is a block diagram showing a first embodiment of a peak factor reduction unit 30 according to the present invention.

FIG. 5 is a block diagram showing a first embodiment of the peak factor reduction unit 30 according to the present invention. The peak factor reduction unit 30 of the present invention reduces the peak factor of the complex signal X1 outputted from the IFFT unit 24 based on the subcarrier map information M and generates the complex signal X2 whose spectrum agrees with that of the complex signal X1.

The peak factor reduction unit 30 of the first embodiment substantially consists of a complex exponential function generation unit 31 for generating a complex exponential function B from the subcarrier map information M, a weight vector generation unit 32 for generating a weight vector W from the complex signal X1 outputted from the IFFT unit 24, and a complex signal generation unit 33 for generating the complex signal X2 based on the complex signal X1, the complex exponential function B, and the weight vector W.

The complex exponential function generation unit 31 deletes columns corresponding to the stop wave subcarrier frequencies that the subcarrier map information M shows from the inverse DFT matrix F of NFFT rows×NFFT columns, and outputs a matrix of NFFT rows×NSC columns as the complex exponential function B.

FIG. 6 shows the inverse DFT (Inverse Discrete Fourier Transform) matrix F with a value of NFFT reduced to "8" due to limitations of space. Here, it is assumed that the subcarrier map information M was "01000011." In this case, since the 0th, 2nd, 3rd, 4th, and 5th elements of the map are "0" that indicates stop wave subcarrier frequency, the complex exponential function generation unit 31 deletes the 0th, 2nd, 3rd, 4th, and 5th columns that correspond to the stop wave subcarrier frequencies from the inverse DFT matrix F, and outputs an inverse DFT matrix consisting of the 1st, 6th, and 7th columns that correspond to the transmit subcarrier frequencies as the complex exponential function B. In the case where the inverse DFT matrix is as shown by FIG. 6, the complex exponential function generation unit 31 outputs a matrix shown in FIG. 7 as the complex exponential function B.

Figure 8:
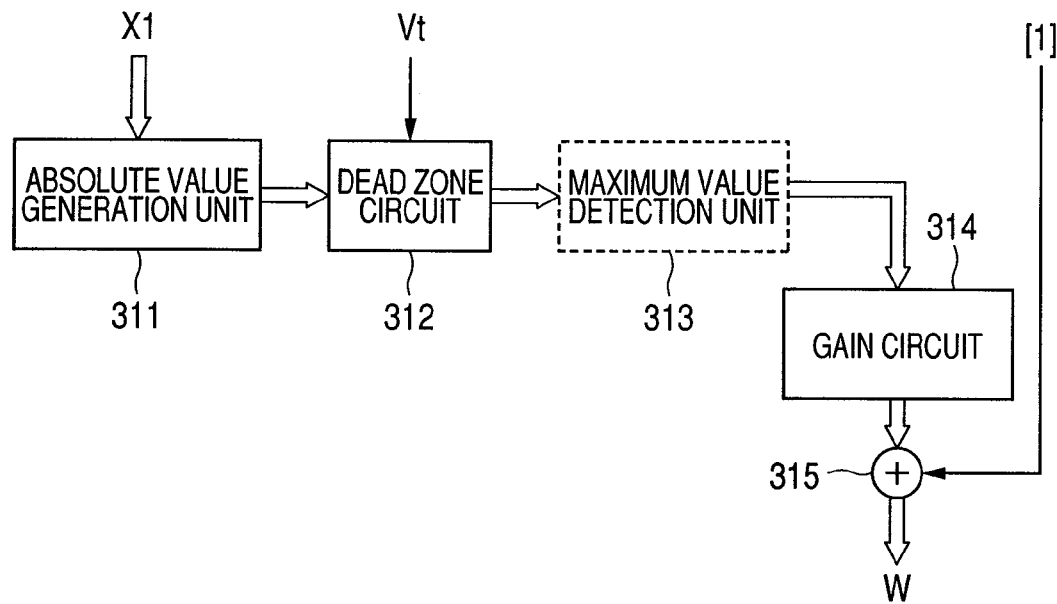
FIG. 8 is a diagram showing a configuration of a weight vector generation unit 32 of FIG. 5.

The weight vector generation unit 32 generates the weight vector W from the complex signal X1. The weight vector generation unit 32 substantially consists, as shown in FIG. 8, of an absolute value generation unit 311 for outputting an amplitude |X1| of the complex signal X1, a dead zone circuit 312, a gain circuit 314 for amplifying an output of the dead zone circuit 312, and an adding circuit 315 for adding "1" to the output of the gain circuit 314. Incidentally, as shown by a dashed line block in FIG. 8, the weight vector generation unit 32 is provided with a maximum value detecting circuit 313 for outputting an impulse at a position where an output of the dead zone circuit becomes maximum, being located between the dead zone circuit 312 and the gain circuit 314, as necessary.

Figure 9:
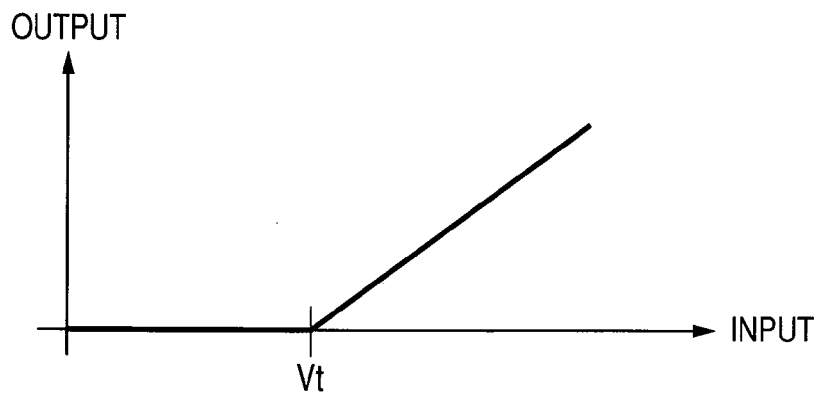
FIG. 9 is a graph showing an input/output characteristic of a dead zone circuit 312 of FIG. 8.

The dead zone circuit 312 extracts an amplitude component that exceeds a threshold Vt from the amplitude |X1| of the complex signal X1, as shown in FIG. 9, for example. For example, if it is intended that the amplitude of the complex signal X1 is limited to 7 dB with a signal root-mean square value=1, the threshold Vt is set to 2.2387 (="7/20" power of 10). The output of the dead zone circuit 312 is amplified by A times (for example, A=1,000,000) by the gain circuit 314, and "1" is added to this by the adding circuit 315, which is outputted as the weight vector W.

Figure 10:
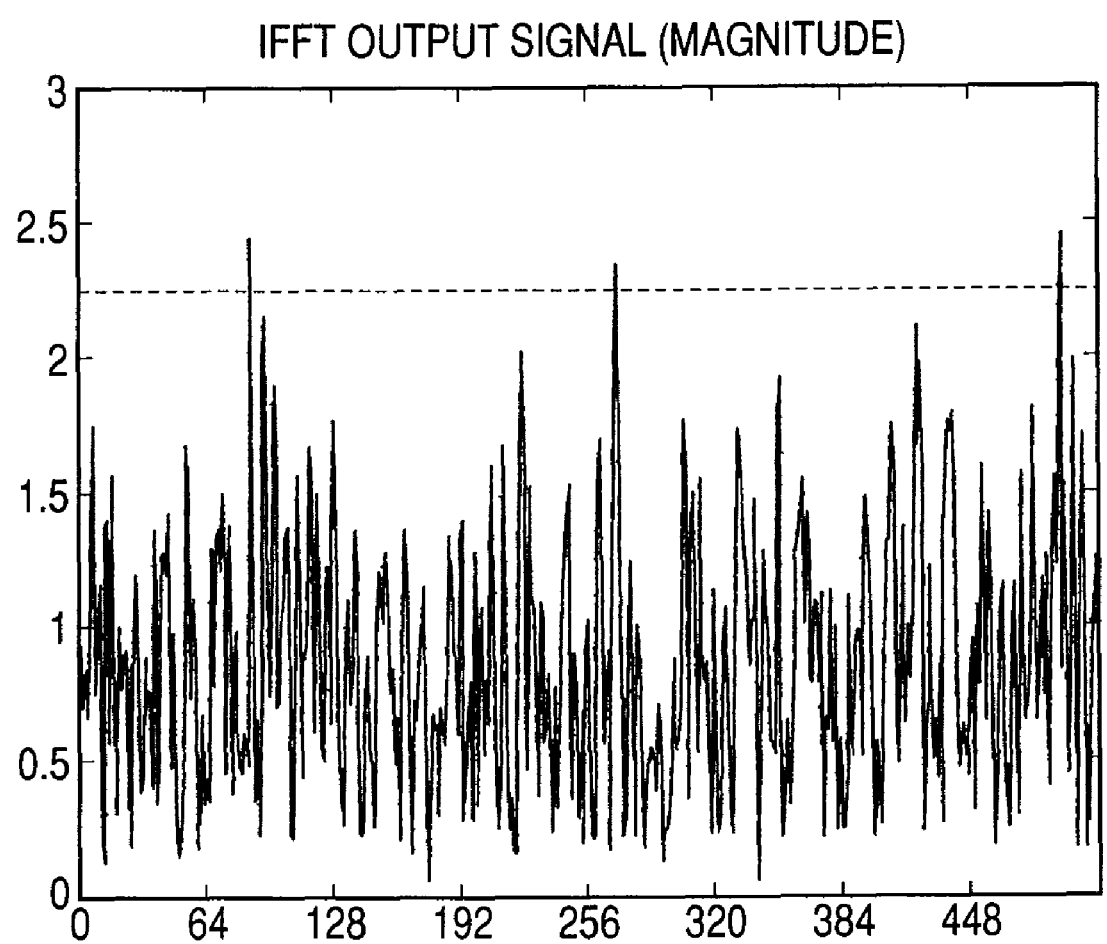
FIG. 10 is a diagram showing one example of an amplitude waveform of the complex signal X1.
Figure 11:
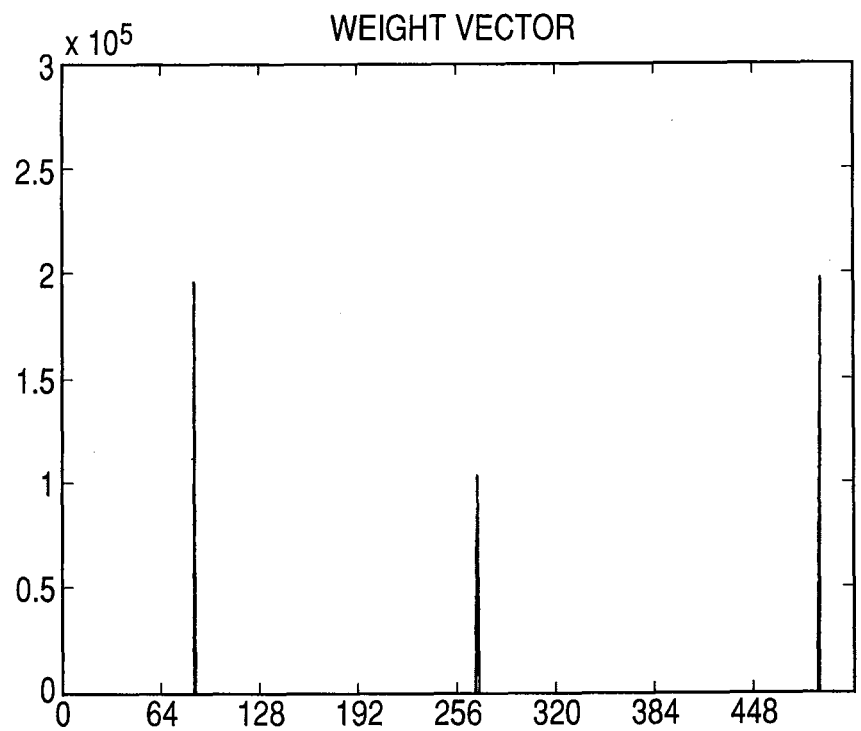
FIG. 11 is a diagram showing one example of the weight vector W outputted from the weight vector generation unit 32.

When the complex signal X1 outputted from the IFFT unit 24 becomes, for example, an amplitude waveform shown in FIG. 10, the weight vector generation unit 32 outputs the weight vector W shown in FIG. 11.

Based on the complex signal X1, the complex exponential function B, and the weight vector W, the peak amplitude is limited in the complex signal generation unit 33, which generates the complex signal X2 approximate to the complex signal X1 as a whole of waveform. The spectrum of the complex signal X2 must be masked by the complex signal X1, and such a complex signal X2 can be realized by making a linear combination related to columns of the complex exponential function B. Moreover, the peak amplitude of the complex signal X2 must be limited and the complex signal X2, as a whole, must be approximate to the complex signal X1. From this standpoint, in the peak factor reduction unit 30 of the first embodiment, the complex signal generation unit 33 converts the complex signal X1 into the complex signal X2 using the weighted least squares method with the weight vector W.

Figure 12:
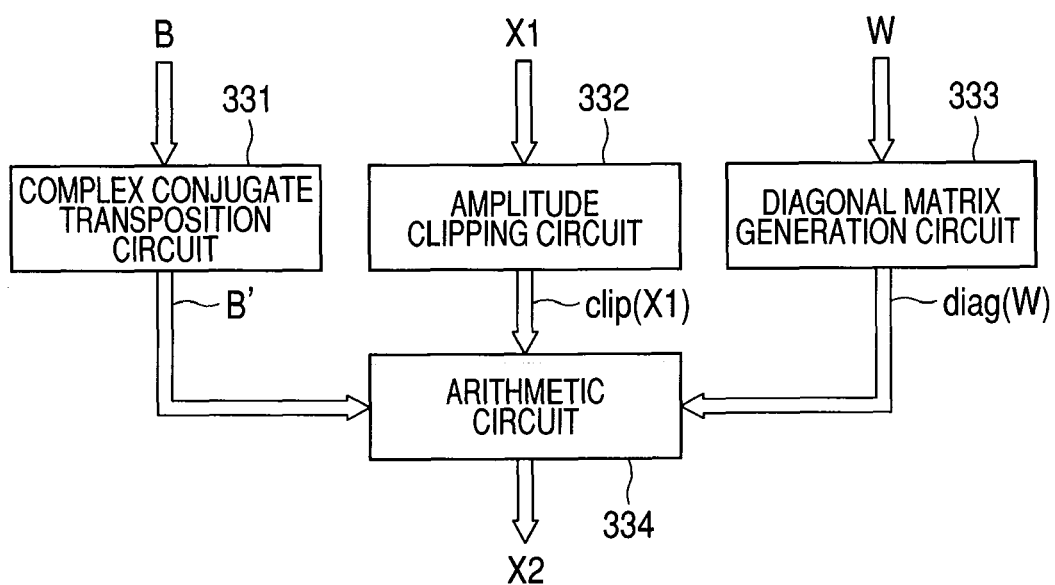
FIG. 12 is a diagram showing one embodiment of a complex signal generation unit 33 of FIG. 5.

FIG. 12 shows one embodiment of the complex signal generation unit 33. In this embodiment, the complex signal generation unit 33 substantially consists of a complex conjugate transposition circuit 331 for performing conjugate transposition on the complex exponential function B, an amplitude clipping circuit 332 for limiting the amplitude of the complex signal X1 to be within Vt, a diagonal matrix generating circuit 333 for generating a matrix whose diagonal elements are the weight vector W, and an arithmetic circuit 334 connected to these circuits.

In the peak factor reduction unit 30 of the first embodiment, the amplitude clipping circuit 332 generates a signal clip(X1) such that the amplitude of the complex signal X1 is limited to be within Vt, and the arithmetic circuit 334 derives the complex symbol signal X2 with a reduced peak factor according to the formula (the first algorithm) of the weighted least squares method shown by Formula 1.

$$X2 = B \times C$$

where $C = \mathrm{inv}(B' \times \mathrm{diag}(W) \times B) \times B' \times \mathrm{diag}(W) \times \mathrm{clip}(X1)$ (Formula 1)

In the above-mentioned formula (Formula 1) of weighted least squares method, a function diag(W) means a diagonal matrix that has diagonal elements equal to the argument W, and corresponds to the output of the diagonal matrix generating circuit 333. B' affixed with a dash means complex conjugate transposition of the matrix B, and corresponds to the output of the diagonal matrix generating circuit 333. The function inv( ) means an inverse matrix. Moreover, the function clip(X1) means performing amplitude limiting of the complex signal X1 with the threshold Vt while keeping its argument, and corresponds to the output of the amplitude clipping circuit 332.

Figure 14:
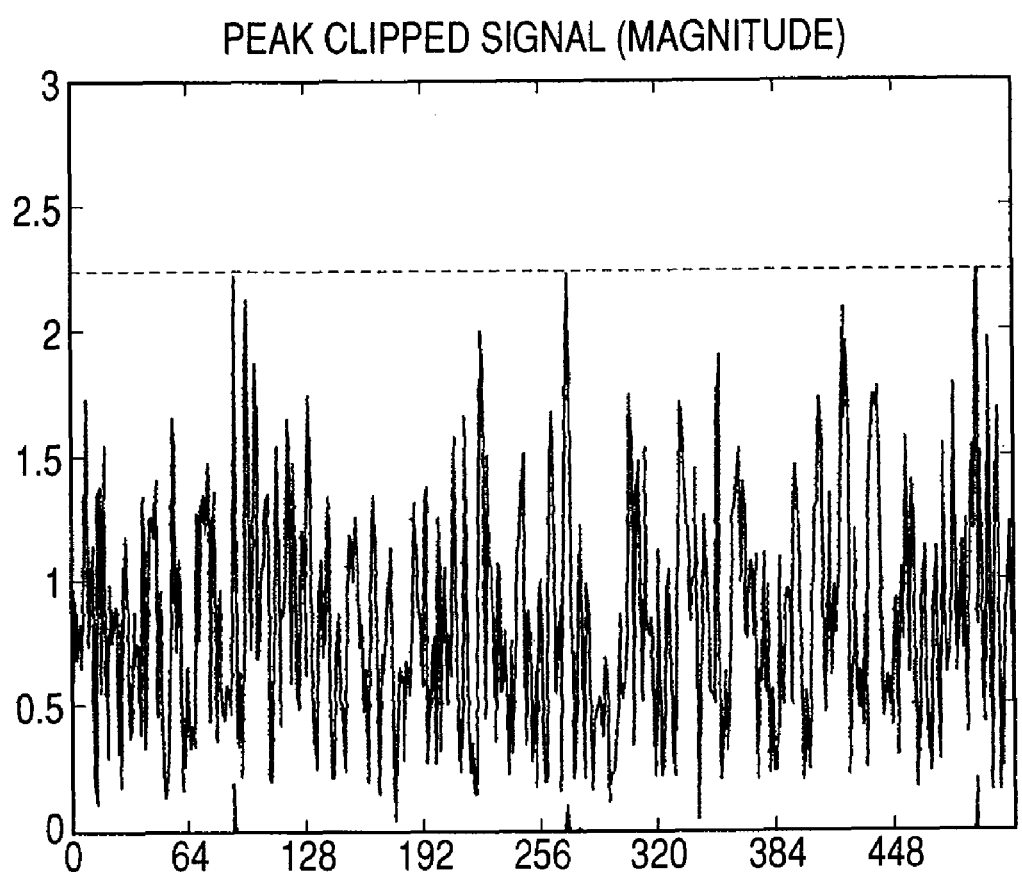
FIG. 14 is a diagram showing one example of an amplitude waveform of clip(X1) outputted from an amplitude clipping circuit 332.

The function clip(X1) can be defined as follows. FIG. 14 shows one example of the amplitude waveform of clip(X1) outputted from the amplitude clipping circuit 332.

$$\text{clip}(X1) = Vt \times X1/|X1| \text{ for } |X1| > Vt$$

$$\text{clip}(X1) = X \text{ for } |X1| <= Vt$$

In Formula 1, the complex exponential function B is a rectangular matrix whose columns are selected from the inverse DFT matrix explained in FIG. 7 so that the columns may correspond to the transmit subcarrier frequencies. In the example of FIG. 7, the complex exponential function B consists of the 1st, 6th, and 7th columns of the inverse DFT matrix, where the 1st column can be rewritten as $\exp(j\omega1t)$, the 6th column as $\exp(j\omega6t)$, and the 7th column as $\exp(j\omega7t)$.

Moreover, in Formula 1, C denotes complexes that correspond to the 1st, 6th, and 7th columns of the inverse DFT matrix that is shown by the complex exponential function B, respectively. Now, assume that these values are $\alpha1+j\beta1$, $\alpha6+j\beta6$, and $\alpha7+j\beta7$. The arithmetic circuit 334 executes $(\alpha1+j\beta1)\times\exp(j\omega1t)+(\alpha6+j\beta6)\times\exp(j\omega6t)+(\alpha7+j\beta7)\times\exp(j\omega7t)$ as an arithmetic operation of $X2=B\times C$ that Formula 1 shows. That is, a linear combination of the subcarrier frequencies used for wave transmission is realized.

The peak factor reduction unit 33 of this embodiment is characterized in that the inverse DFT matrix B that corresponds to the subcarriers used for transmission of data and a matrix C of complex signals that corresponds to the inverse DFT matrix B are generated based on the subcarrier map information M and the complex signal X1, and the complex signal X2 with a suppressed peak factor is generated by matrix calculation of B·C.

According to this embodiment, by the action of the weight vector W, the peak factor reduction unit 33 can generate the complex signal X2 such that an amplitude peak part has a high degree of approximation to the complex signal X1 and the peak factor is reduced. Moreover, since the complex signal X2 with the reduced peak factor consists of the same subcarriers as the subcarriers used for transmission, the transmission spectrum shape of the complex signal X1 agrees with that of the complex signal X2. That is, since the spectrum of the noise signal accompanying peak factor reduction is masked by the spectrum of the transmitting signal, there is no leakage of the noise electric power to the stop wave band.

Figure 15:
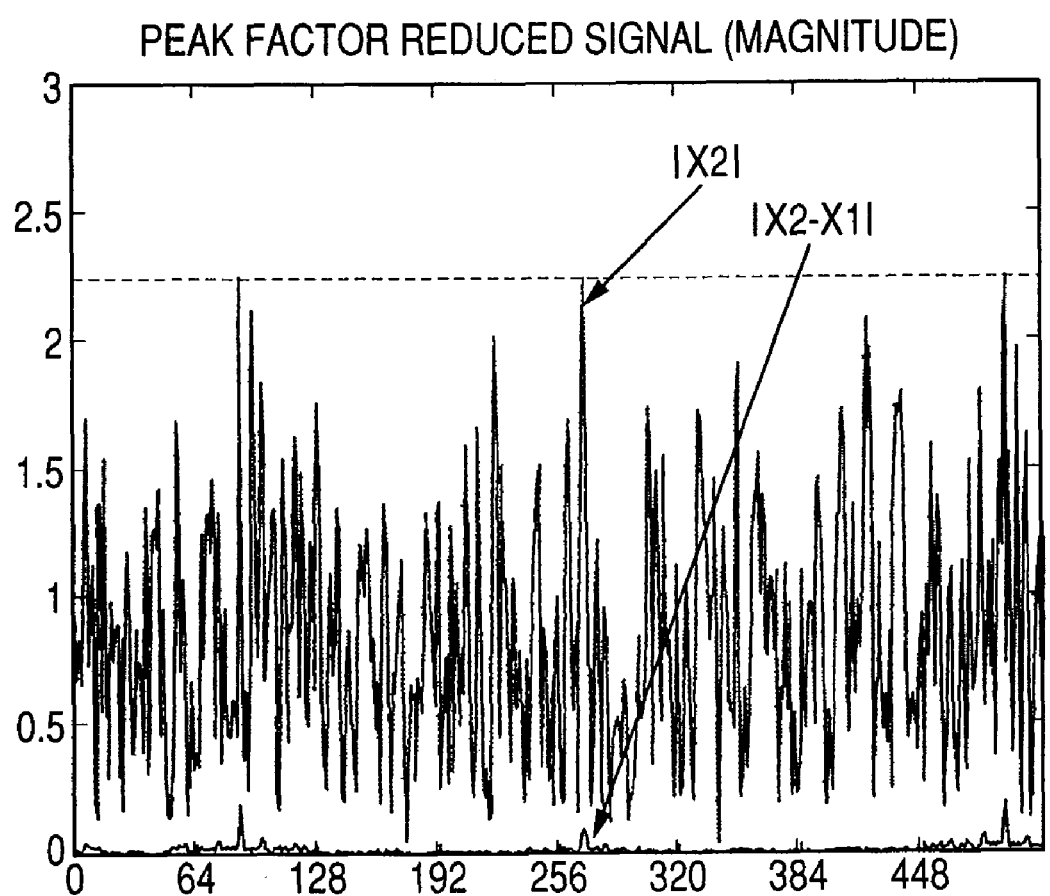
FIG. 15 is a diagram showing an amplitude |X2| of a complex signal X2 and an amplitude |X2−X1| of an error signal that are outputted from an arithmetic circuit 334.

FIG. 15 shows an amplitude |X2| of the complex signal X2 outputted from the arithmetic circuit 334, and an amplitude |X2–X1| of an error signal.

Next, a second embodiment of the peak factor reduction unit 30 according to the present invention will be explained. In the algorithm of the first embodiment described above, if the weight vector W is not used, each column of the complex exponential function B will act as an orthogonal bases; therefore, the formula of the least squares method can be modified as follows.

$$X2 = B \times C \qquad \text{(Formula 2)}$$

$$C = inv(B' \times B) \times B' \times \text{clip}(X1)$$

$$= ifft(fft(\text{clip}(X1)) \times M)$$

Here, M denotes subcarrier map information, fft(clip(X1)) denotes performing a fast Fourier transform on clip(X1), and ifft( ) denotes performing an inverse FFT on ( )). Therefore, the above-mentioned Formula 2 indicates operations of clipping the amplitude of the complex signal symbol X1, converting the complex signal whose amplitude is clipped into a signal in the frequency domain temporarily by FFT, nulling all the contributions of frequency components that correspond to the stop wave subcarriers indicated by the subcarrier map information M, and subsequently returning it into the temporal domain by IFFT, and can be interpreted as a convolution arithmetic operation using a Fourier transform.

The complex symbol signal X2 obtained by Formula 2 stands as an optimal approximation in terms of minimization of the square error because of a nature of Fourier transform. However, because it is optimal approximation, the error is distributed equally at the whole sample points of NFFT, and the degree of approximation near the peak is not very good. That is, there remains a problem that the peak amplitude can be reduced by some degree, but is not suppressed sufficiently.

To solve this problem, the peak factor reduction unit 30 of the second embodiment of the present invention repeats the procedure shown by Formula 2 two or more times for the complex symbol signal X2, and thereby reduces the peak asymptotically (the second algorithm). That is, the following while loop processing is applied.

$$X2 = X1;$$

$$\text{while } (\max(|X2|) > VT) X2 = ifft(fft(\text{clip}(X2) \times M)) \qquad \text{(Formula 3)}$$

Figure 13:
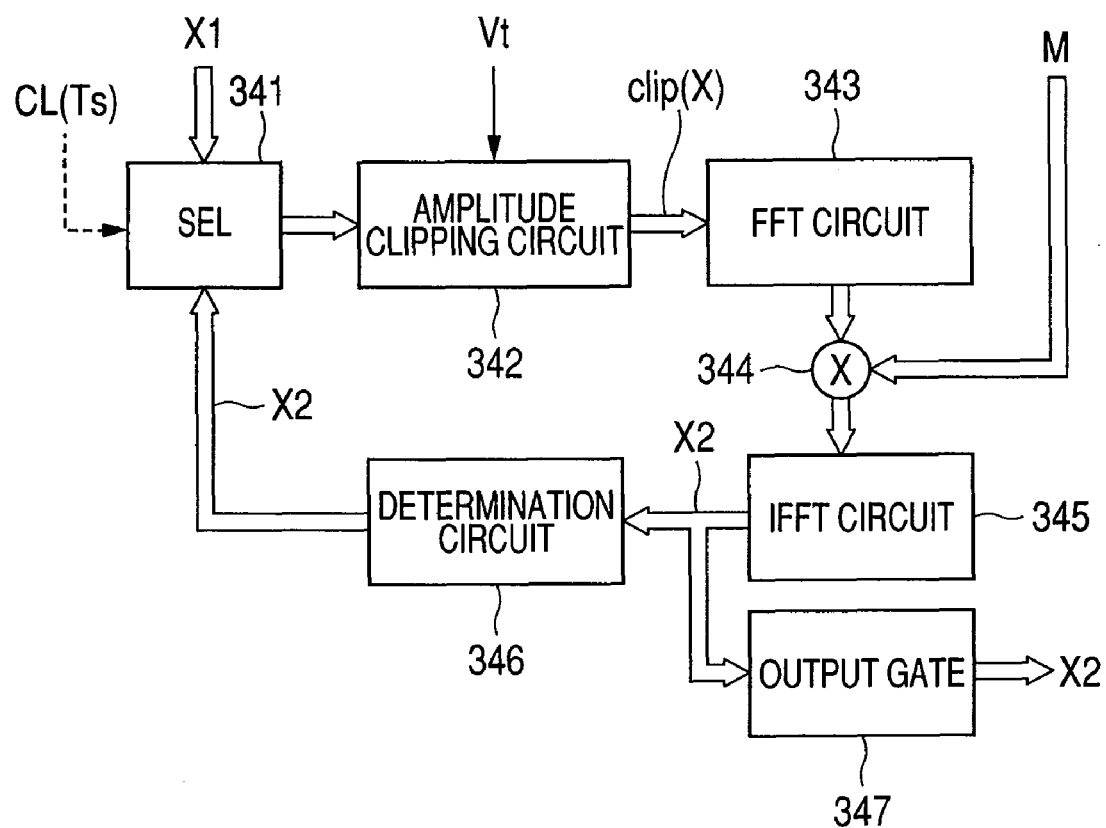
FIG. 13 is a diagram showing a second embodiment of the peak factor reduction unit 30.

FIG. 13 shows a configuration of the peak factor reduction unit 30 of the second embodiment. The peak factor reduction unit 30 of this embodiment is also converting the complex signal X1 into the complex signal X2 with a reduced peak factor using the subcarrier map information M.

In this embodiment, the procedure shown by Formula 3 is repeated in a predetermined period Ts that corresponds to a symbol length of OFDM. Following clock CL(Ts) generated for every period Ts, a selector 341 selects the complex signal X1 outputted from the IFFT unit 24 in the initial arithmetic cycle of the complex signal X2, while it selects the complex signal X2 outputted from a determination circuit 346 from the next arithmetic cycle onward, and makes it input into an amplitude clipping circuit 342.

The amplitude clipping circuit 342 extracts an amplitude that exceeds the threshold Vt from the inputted complex signal (X1 or X2), and outputs a complex signal clip(X) subjected to amplitude clipping into an FFT circuit 343. The FFT circuit 343 performs a Fourier transform on the complex signal clip(X), and outputs fft(clip(X)). fft(clip(X)) is put in multiplication by the subcarrier map information M in an inner product circuit 344, and a calculated result (clip(X2)× M) is inputted into an IFFT circuit 345. The IFFT circuit 345 performs an inverse fast Fourier transform on fft(clip(X2)× M), and outputs the complex signal X2 for each arithmetic cycle.

The complex signal X2 outputted from the IFFT circuit 345 is inputted into a determination circuit 246 and an output gate 347. If the determination circuit 246 finds |X2|>VT by comparing the amplitude |X2| of the complex signal X2 with the threshold VT, it will output the complex signal X2 to the selector 341.

The determination circuit 246 holds the complex signal X2 of the preceding arithmetic cycle that was outputted to the selector 341 in each arithmetic cycle. It outputs a new complex signal X2 outputted from the IFFT circuit 345 a long as |X2|>VT stands, and outputs the same complex signal X2 as that in the preceding arithmetic cycle to the selector 341 when |X2|<VT or |X2|=VT becomes established.

Therefore, once a condition |X2|<VT or |X2|=VT is established, the same fft (clip(X2)×M) as that in the preceding cycle is inputted into the IFFT circuit 345, and the IFFT circuit 345 will generate the same complex signal X2 as that in the preceding cycle repeatedly.

In each arithmetic cycle, the output gate 347 selects the complex signal X2 generated in the last arithmetic cycle of the period Ts among the complex signals X2 generated by the IFFT circuit 345, and outputs it to the guard interval insertion and window setting unit 25 as the complex signal X2 with a reduced peak factor.

Figure 16:
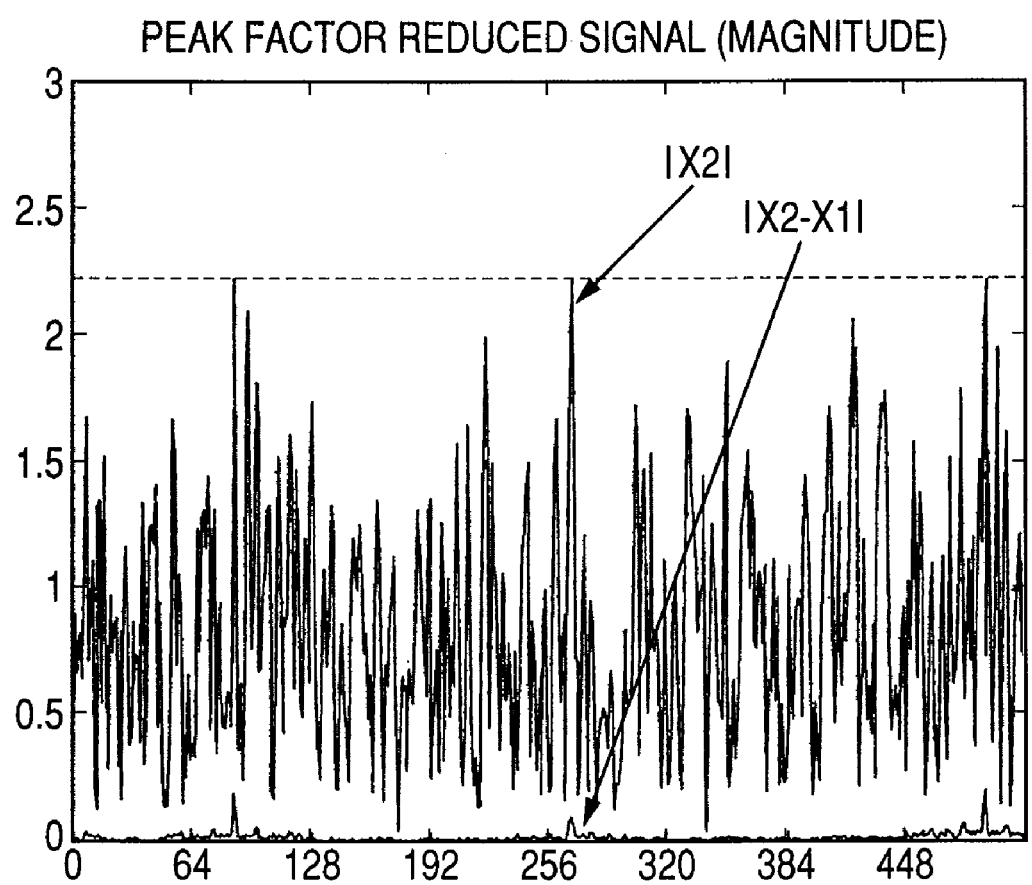
FIG. 16 is a diagram showing one example of an amplitude |X2| of a complex signal X2 and the amplitude |X2−X1| of the error signal obtained by the peak factor reduction unit 30 of the second embodiment.

FIG. 16 shows one example of the amplitude |X2| of the complex signal X2 that was obtained by the peak factor reduction unit 30 of the second embodiment and the amplitude |X2−X1| of the error signal.

According to the first algorithm, the arithmetic circuit 334 should just perform one arithmetic operation of the complex signal X2 for each OFDM symbol period Ts, but the arithmetic operation of X2 includes complicated inverse matrix calculation. On the other hand, according to the second algorithm, the arithmetic operation of the complex signal X2 is repeated for a plurality of times until a condition |X2|<VT or |X2|=Vt is established. However, since the second algorithm negates the need for inverse matrix calculation, there is an advantage that the FFT unit 343 and the IFFT unit 345 both capable of fast processing can be applied for arithmetic operations of the complex signal X2.

For generation of the complex signal X2 with a reduced peak factor, several algorithms are conceivable except the first and second algorithms described above. As one example of such algorithms, a third algorithm using Lagrange's undetermined multipliers method will be explained briefly. In the third algorithm, the difference signal "X1−clip(X1)" between the complex signal X1 and a complex signal clip (X1) that is the complex signal X1 whose amplitude is clipped is generated. The difference signal "X1−clip(X1)" means a signal component equal to the amount by which the amplitude included in the complex signal X1 exceeds the threshold Vt. On the other hand, for the complex exponential function B serving as bases, a coefficient vector C=(cr0+jci0, cr1+jci1, . . . ) T is introduced, and X1−clip(X1) is approximately expressed by an inner product B·C of B and C. The electric power of B·C is (cr0²+ci0²)+(cr1²+ci1²)+ . . . .

Here, it is assumed that there are K sample points each of which has an amplitude exceeding the threshold Vt among NFFT sample points of the complex signal X1, and these indices are designated by I(k) (k=1, 2, . . . , K) Moreover, a constraint condition is defined so that X1−clip(X1)−B·C=0 is established for all the K sample points. If the constraint condition is divided into a real part and an imaginary part in consideration of a fact that it is a complex, 2K equations will be obtained in total. The equations of the real part are designated by Frk=0 (k=1, 2, . . . , K) and the equations of the imaginary part are designated by Fik=0 (k=1, 2, . . . , K).

$$Frk = Re[X1(I(k)) - \text{clip}(X1(I(k))) - B(I(k)) \cdot C] = 0$$

$$Fik = Im[X1(I(k)) - \text{clip}(X1(I(k))) - B(I(k)) \cdot C] = 0$$

Although depending on a value of Vt, since normally the number of peaks appearing in the complex signal X1 is not so large, when the number of the condition equations becomes smaller than the number of variables, it will become impossible to determine values of the coefficient vector C. Then, the Lagrange's undecided multipliers ark, aik (k=1, 2, . . . , K) are introduced, and under the constraint condition described above, equations that attain a minimum in a value of electric power (cr0²+ci0²)+(cr1²+ci1²)+ . . . are derived, and are given as follows:

$$L = (cr0^2 + ci0^2) + (cr1^2 + ci1^2) + \ldots - ar1\ Fr1 -$$
$$ar2\ Fr2\ \ldots - ark\ FrK - ai1\ Fi1 - ai2\ Fi2\ \ldots - aik\ FiK$$

$$dL/dcr0 = 0, dL/dcr1 = 0, \ldots,$$

$$dL/dci0 = 0, dL/dci1 = 0, \ldots,$$

$$dL/dar1 = 0, dL/dar2 = 0, \ldots, dL/darK = 0,$$

$$dL/dai1 = 0, dL/dai2 = 0, \ldots, dL/daiK = 0$$

The above-mentioned equations constitute simultaneous linear equations about the coefficient vector crk, cik and the Lagrange's undecided multipliers ark, aik, and values of the coefficient vector C are determined as their solutions.

Finally, the peak factor reduction signal X2=X1−B·C can be obtained by subtracting the inner product signal B·C from X1. Here, X1 consists of the complex exponential function B as the bases from a principle of OFDM. Therefore, since X2 consists of the complex exponential function B as the bases, the third algorithm as well as the first and second algorithms can generate a complex symbol signal with a reduced peak factor by applying only frequency components that become transmit subcarriers.

In the foregoing, three kinds of typical algorithms applicable to generation of the complex signal X2 were explained. Processing after the generation of X2 is common to all the algorithms, i.e., the cyclic prefix is inserted into the complex signal X2 and window processing is performed by the guard interval insertion unit 25. What is required for the cyclic prefix is just to copy NCP (=64) sample points from the second half part of sample points that constitute the OFDM symbol and add them to the first half part of the OFDM symbol. By doing this, the sample points of the OFDM symbol increase to (NFFT+NCP) (=576).

Figure 17:
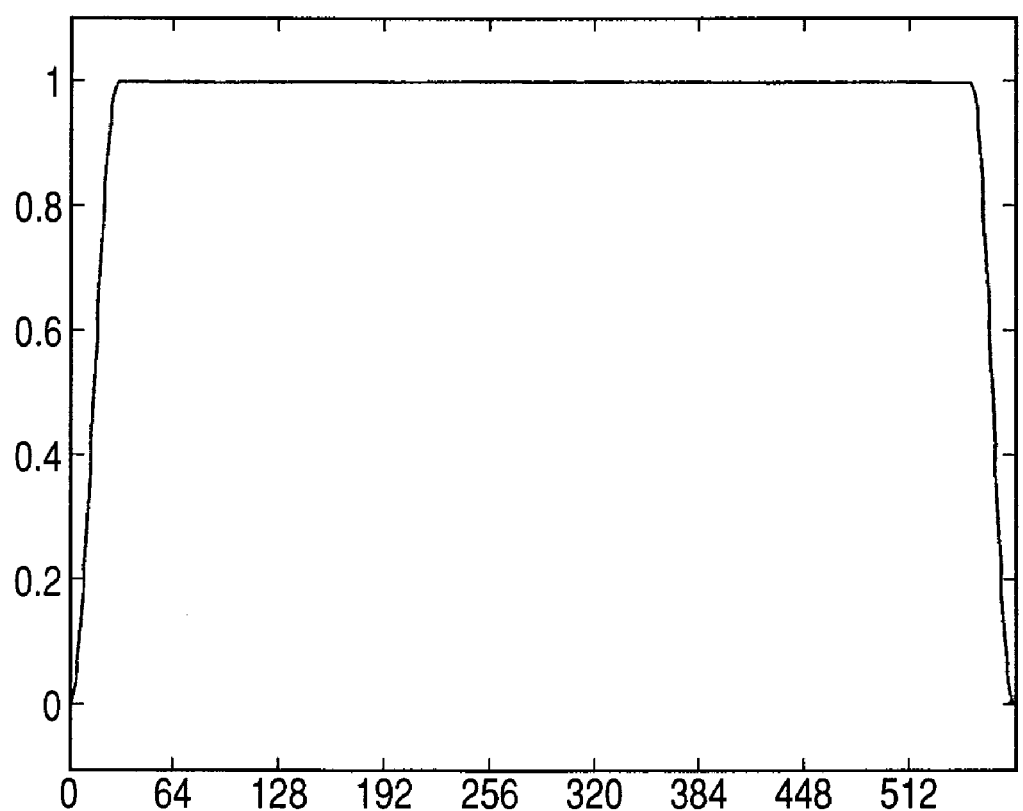
FIG. 17 is a diagram showing a Turkey window of a taper ratio of 5%.

Since the window processing mitigates an effect of signals becoming discontinuous in connecting different blocks, it is effective to prevent spreading of the spectrum. However, since a portion of an original effect of the cyclic prefix is impaired, there is a case where the window processing is not performed depending on a system. In this embodiment, as shown in FIG. 17, a Tukey window with a taper ratio of 5% is used, for example.

In the foregoing, processing of one block outputted from the serial to parallel converter 22 was explained. FIGS. 18 to 21 show results obtained by generating the OFDM symbol consisting of 32 blocks by the same method and evaluating the transmission spectrum and a CCDF (Complementary Cumulative Distribution Function). FIG. 18 shows the transmission spectrum and the CCDF in the first embodiment (the first algorithm); FIG. 19 shows the transmission spectrum and the CCDF in the second embodiment (the second algorithm).

Figure 18A:
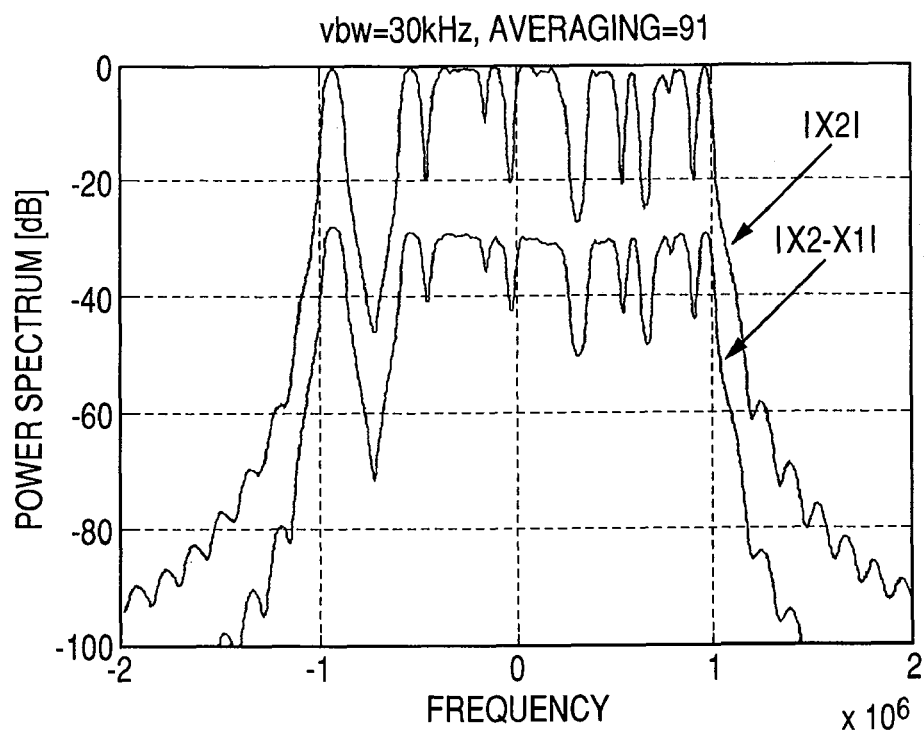
FIGS. 18A and 18B are diagrams showing a transmission spectrum and a CCDF in the first embodiment (the first algorithm), respectively.
Figure 18B:
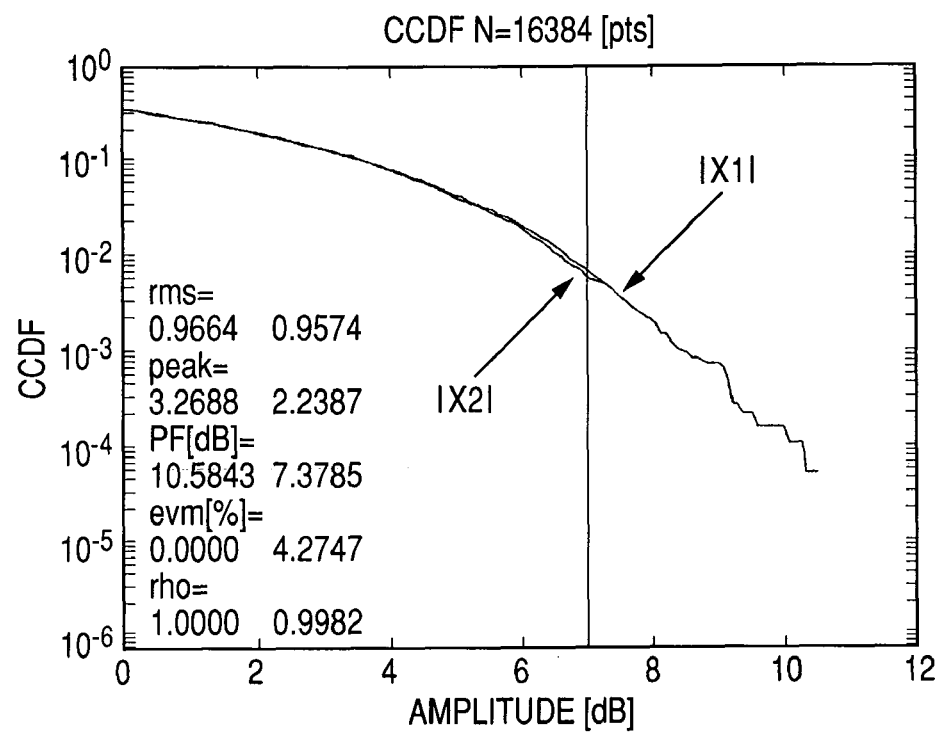
Figure 19A:
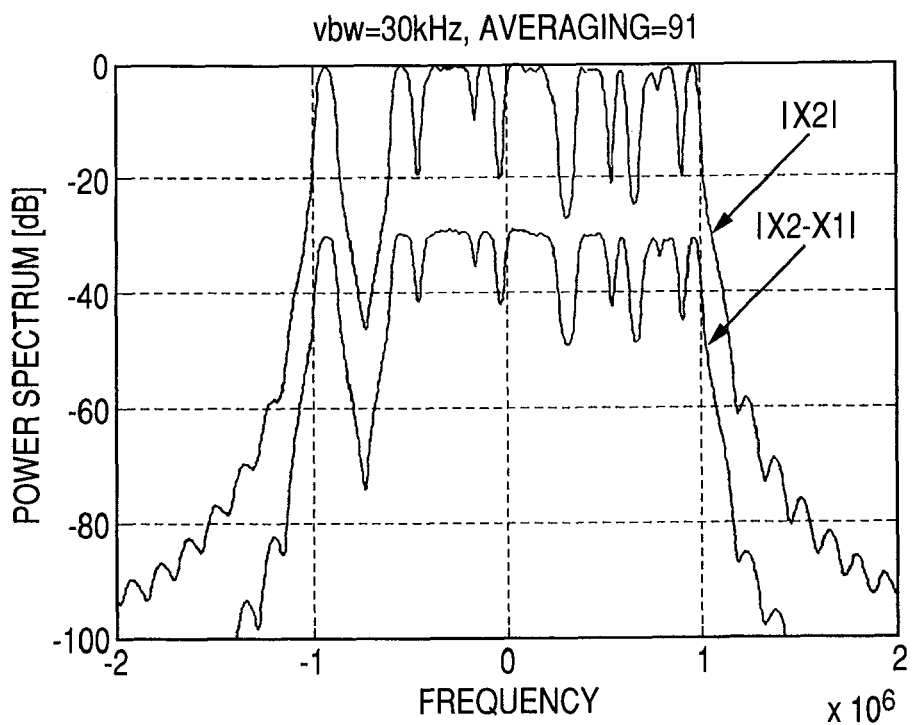
FIGS. 19A and 19B are diagrams showing the transmission spectrum and the CCDF in the second embodiment (the second algorithm), respectively.
Figure 19B:
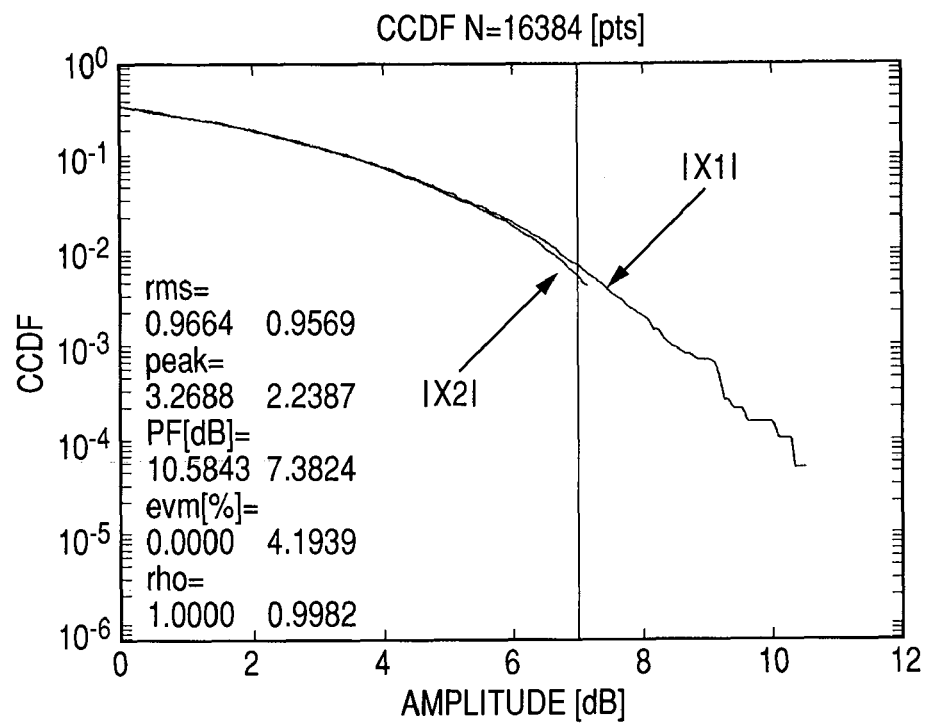

As is clear from FIGS. 18A and 19A showing the transmission spectra, in either case of the first and second algorithms, the noise spectrum is masked by the transmission spectrum and leakage to the outside of the transmission band is not recognized. Moreover, as is clear from FIGS. 18B and 19B showing the CCDF, for the original complex signal |X1|, the peak factor was more than or equal to 10 dB while for the complex signal |X2| that was subjected to the peak factor reduction processing, the peak factor is limited to approximately 7 dB. Of the complex signal |X2|, EVM (Error Vector Magnitude) indicating signal quality degradation is about 4.2%, proving that it has excellent signal quality.

The complex signal X2 outputted from the OFDM modulator of the present invention is supplied to the RF transmitting unit 40 shown in FIG. 1, is converted into an analog signal by the D/A converter 10, subsequently is upconverted to a radio frequency band by being modulated orthogonally by the frequency conversion unit 42, is amplified to a predetermined electric power by the power amplifier 43, and is outputted to an antenna. In the present invention, since the peak factor of a transmitting signal is decreased by about 3 dB, even if an amplified output is increased by 3 dB (about twice), the power amplifier 43 will not be saturated.

What is claimed is:

1. An orthogonal frequency domain multiplexing (OFDM) modulator, comprising:
   a quadrature amplitude modulation (QAM) modulator for performing primary conversion of transmit data supplied as serial data;
   a serial to parallel converter for blocking a complex symbol signal sequence outputted from the QAM modulator for each set of a predetermined number of complex symbols and outputting them as parallel complex symbol signals;
   a subcarrier mapping unit for mapping each of the complex symbol signals outputted from the serial to parallel converter into one of a plurality of subcarriers whose frequencies are mutually different based on subcarrier map information M;
   an inverse fast Fourier transform (IFFT) unit for performing an inverse fast Fourier transform on the complex symbols outputted from the subcarrier mapping unit and outputting it serially as a complex signal X1;
   a guard interval insertion unit for adding a cyclic prefix acting as a guard interval to the complex signal X1 and performing window processing; and
   a parallel to serial converter for converting an output of the guard interval insertion unit into a serial signal;
   wherein the OFDM modulator further includes a peak factor reduction unit for converting the complex signal X1 into a complex signal X2 with a reduced peak factor based on the subcarrier map information M, being located between the IFFT unit and the guard interval insertion unit,
   wherein the guard interval insertion unit is configured to add a cyclic prefix to the complex signal X2 with a reduced peak factor and perform the window processing,
   wherein the subcarrier map information M specifies a frequency of a transmit subcarrier that should transmit a complex symbol generated by the QAM modulator and a frequency of a stop wave subcarrier that does not contain an effective complex symbol, and
   wherein the peak factor reduction unit converts the complex signal X1 into the complex signal X2 with a reduced peak factor based on a complex exponential function matrix B that corresponds to the transmit subcarrier frequencies generated based on the subcarrier map information M.

2. The OFDM modulator according to claim 1,
   wherein the peak factor reduction unit repeats a procedure of:
   performing a Fourier transform on a complex signal subjected to amplitude clipping using the complex signal X1 as an initial input of the amplitude clipping,
   generating the complex signal X2 by performing an inverse fast Fourier transform on a multiplication result of the Fourier transform result and the subcarrier map information M, and
   using the complex signal X2 generated by the inverse fast Fourier transform again as an input of the amplitude clipping in a generation period of the complex signal X1, until the amplitude of the complex signal X2 becomes less than or equal to a threshold Vt, or by a predetermined number of times.

3. An orthogonal frequency domain multiplexing (OFDM) modulator, comprising:
   a quadrature amplitude modulation (QAM) modulator for performing primary conversion of transmit data supplied as serial data;
   a serial to parallel converter for blocking a complex symbol signal sequence outputted from the QAM modulator for each set of a predetermined number of complex symbols and outputting them as parallel complex symbol signals;
   a subcarrier mapping unit for mapping each of the complex symbol signals outputted from the serial to parallel converter into one of a plurality of subcarriers whose frequencies are mutually different based on subcarrier map information M;
   an inverse fast Fourier transform (IFFT) unit for performing an inverse fast Fourier transform on the complex symbols outputted from the subcarrier mapping unit and outputting it serially as a complex signal X1;
   a guard interval insertion unit for adding a cyclic prefix acting as a guard interval to the complex signal X1 and performing window processing; and
   a parallel to serial converter for converting an output of the guard interval insertion unit into a serial signal:
   wherein the OFDM modulator further includes a peak factor reduction unit for converting the complex signal X1 into a complex signal X2 with a reduced peak factor based on the subcarrier map information M, being located between the IFFT unit and the guard interval insertion unit,
   wherein the guard interval insertion unit is configured to add a cyclic prefix to the complex signal X2 with a reduced peak factor and perform the window processing, and
   wherein the subcarrier map information M specifies a frequency of a transmit subcarrier that should transmit a complex symbol generated by the QAM modulator and a frequency of a stop wave subcarrier that does not contain an effective complex symbol, and
   wherein the peak factor reduction unit includes:
   a complex exponential function generation unit for generating a complex exponential function B that correspond to the transmit subcarrier frequencies based on the subcarrier map information M,
   a weight vector generation unit that detects an amplitude exceeding a threshold Vt being set beforehand among the complex signals X1 outputted from the IFFT unit and generates a weight vector W, and
   a complex signal generation unit for converting the complex signal X1 into the complex signal X2 with a reduced peak factor based on the complex exponential function B, the weight vector W, and the complex signal X1.

4. The OFDM modulator according to claim 3,
   wherein the weight vector generation unit includes:
   an absolute value generation unit for outputting an absolute value of the amplitude of the complex signal X1,
   a dead zone circuit for extracting an amplitude that exceeds the predetermined threshold Vt from an output of the absolute value generation unit,
   a gain circuit for multiplying the output of the dead zone circuit by a constant, and an adding circuit for adding a predetermined value to the output of the gain circuit.

5. The OFDM modulator according to claim 3, further comprising a maximum value detecting circuit for outputting an impulse at a position where the output of the dead zone circuit becomes maximum between the dead zone circuit and the gain circuit.

6. The OFDM modulator according to claim 3, wherein the complex signal generation unit converts the complex signal X1 into the complex signal X2 with a reduced peak factor based on:

$$X2 = B \times \mathrm{inv}(B' \times \mathrm{diag}(W) \times B) \times B' \times \mathrm{diag}(W) \times \mathrm{clip}(X1)$$

where diag( ) denotes a diagonal matrix having an argument W as diagonal elements, B' denotes a complex conjugate transposed matrix of B, inv( ) denotes an inverse matrix, and clip( ) denotes performing amplitude limitation with the threshold Vt while keeping its argument.

7. An orthogonal frequency domain multiplexing (OFDM) modulator, comprising:

a quadrature amplitude modulation (QAM) modulator for performing primary conversion of transmit data supplied as serial data;

a serial to parallel converter for blocking a complex symbol signal sequence outputted from the QAM modulator for each set of a predetermined number of complex symbols and outputting them as parallel complex symbol signals;

a subcarrier mapping unit for mapping each of the complex symbol signals outputted from the serial to parallel converter into one of a plurality of subcarriers whose frequencies are mutually different based on subcarrier map information M;

an inverse fast Fourier transform (IFFT) unit for performing an inverse fast Fourier transform on the complex symbols outputted from the subcarrier mapping unit and outputting it serially as a complex signal X1;

a guard interval insertion unit for adding a cyclic prefix acting as a guard interval to the complex signal X1 and performing window processing; and a parallel to serial converter for converting an output of the guard interval insertion unit into a serial signal;

wherein the OFDM modulator further includes a peak factor reduction unit for converting the complex signal X1 into a complex signal X2 with a reduced peak factor based on the subcarrier map information M, being located between the IFFT unit and the guard interval insertion unit, wherein the guard interval insertion unit is configured to add a cyclic prefix to the complex signal X2 with a reduced peak factor and perform the window processing, and wherein the subcarrier map information specifies a frequency of a transmit subcarrier that should transmit a complex symbol generated by the QAM modulator and a frequency of a stop wave subcarrier that does not contain an effective complex symbol, and wherein the peak factor reduction unit includes:

a complex exponential function generation unit for generating a complex exponential function B that corresponds to the transmit subcarrier frequencies based on the subcarrier map information M and a complex signal generation unit that generates a difference signal X1−clip(X1) between the complex signal X1 and a signal obtained from the complex signal X1 by limiting the amplitude thereof to be within a threshold Vt, calculates a coefficient vector C that minimizes an electric power of B·C using a Lagrange's undetermined multipliers method so that, representing an inner product of a complex exponential function B and the coefficient vector C with B·C, X1−clip(X1)−B·C=0 is established at a position where an amplitude of X1 satisfies |X1|>Vt, and generates the complex signal X2 on a condition of X2=X1−B·C.

* * * * *